Jan. 3, 1967     J. J. MASON     3,296,364
TRANSMISSION LINES WITH A NICKEL-MOLYBDENUM-IRON
ALLOY SHEATH FOR DE-ICING
Filed June 2, 1965
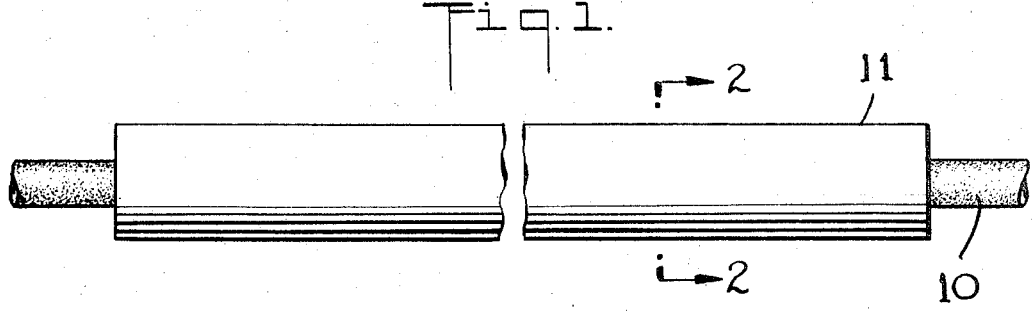
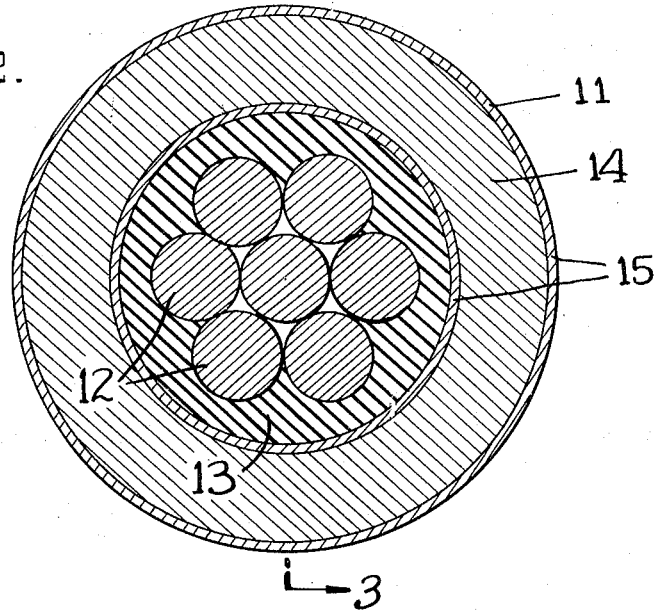
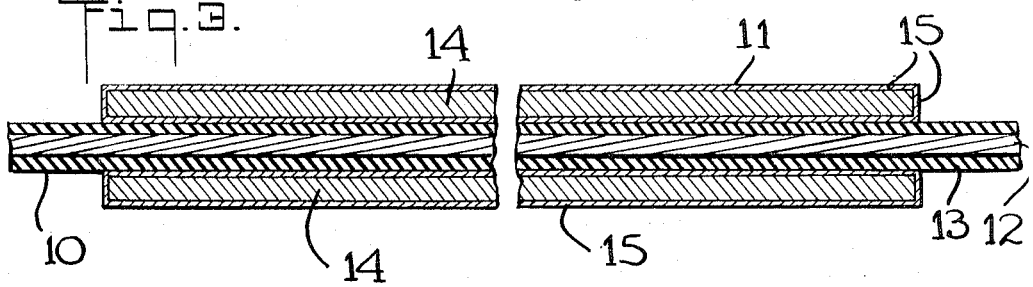
INVENTOR.
JOHN J. MASON
BY
M. L. Pinel
ATTORNEY 3,296,364
TRANSMISSION LINES WITH A NICKEL-MOLYB-
DENUM-IRON ALLOY SHEATH FOR DE-ICING
John Jefferson Mason, Wednesbury, England, assignor to
The International Nickel Company, Inc., New York,
N.Y., a corporation of Delaware
Filed June 2, 1965, Ser. No. 460,773
Claims priority, application Great Britain, June 8, 1964,
23,731/64
10 Claims. (Cl. 174—106)

The present invention relates to electric power transmission lines and, more particularly, to overhead electric power transmission lines which can remain free of ice when exposed to ice-forming atmospheres and, moreover, also relates to articles and alloys for such transmission lines.

It is well known that where overhead electric power transmission lines are exposed to moisture and freezing temperatures, severe difficulties result from formation of ice on the transmission lines. Ice on transmission lines can permanently damage the lines and repair thereof can require several days work while resulting in failure of power transmission service with accompanying inconvenience and expense to power companies and power consumers.

It has been suggested that the formation of ice upon alternating current carrying transmission lines in a moist freezing atmosphere may be inhibited by the use of inductor sheaths made of a material which is non-magnetic at normal atmospheric temperatures but becomes magnetic at low temperatures. If such sheaths are placed around and insulated from the line, particularly along the center part of the catenary of the line, alternating currents in the line induced hysteresis and eddy current losses in the sheaths when these are magnetic. The magnitude of the losses depends upon the magnetic induction (which in turn depends upon the temperature) on the sheath.

It has further been suggested that such an inductor sheath should have a continuous outer skin of a metal of good electrical conductivity such as, for example, copper or aluminum. This outer skin acts as a single-turn secondary winding of a transformer and the circulating currents induced in it provide a heating effect additional to that developed in the alloy of the sheath. In fact, under otpimum conditions the circulating skin currents provide the major part of the heat loss. The magnitude of the circulating currents depends upon the coupling of the transformer and consequently varies with the magnetic induction of the alloy of the sheath. For satisfactory commercial operation, the sheath must be capable of developing sufficient heat to prevent the presence of ice on the line in freezing environments even when the line is not carrying a full load of current, e.g., when the line is operating at only one-quarter load. Also, the alloy of the sheath must have characteristics enabling sufficient induction heating without requiring use of an excessively large volume of alloy in the sheath since if too great a volume of alloy is required in the sheath, the sheath will be excessively heavy and will overstress the transmission line. Difficulties also arise if the induction of the sheath is too great when at temperatures substantially above freezing, e.g., 40° C. and higher, because excessive induction results in excessive power loss and unduly high costs.

Although many attempts were made to overcome the foregoing difficulties and disadvantages and other difficulties, none as far as I am aware, was entirely successful when carried into practice commercialy on an industrial scale.

It has now been discovered that a new inductor sheath comprising an alloy containing iron, nickel and molybdenum in special proportions which provide special physical characteristics resulting in new and/or substantially enhanced qualities of utility enables highly satisfactory inhibition of icing on electric power transmission lines carrying alternating curent.

It is an object of the present invention to provide an electric power transmission line which, when in unattended operation carrying alternating current, is capable of ice-free operation while exposed to ice-forming environments and is also capable of highly efficient power transmission when at temperature substantially above freezing.

It is a further object of the invention to provide a transmission line inductor sheath having a temperature-responsive characteristic enabling the sheath to develop heat from electromagnetic flux when heat is needed for de-icing a transmission line.

The invention also contemplates providing a new temperature-responsive alloy characterized by a high increase in magnetic induction when the temperature of the alloy is decreased from substantially above freezing temperature to near or below freezing temperature.

Other objects and advantages will become apparent from the following description taken in conjunction with the accompanying drawing in which:

FIGURE 1 is a side view of a transmission line within the scope of the invention;

FIGURE 2 is a cross-sectional view in enlarged scale of the transmission line of FIGURE 1 taken along line 2—2 of FIGURE 1; and FIGURE 3 illustrates a cross-sectional view of the transmission line of FIGURE 1 taken along line 3—3 of FIGURE 2.

The present invention contemplates a new inductor sheath which is specially adapted for use as a temperature-responsive induction heating sheath on a transmission line carrying alternating curent. The inductor sheath of the invention comprises a tube of a special iron-nickel-molybdenum alloy contemplated by the invention and also comprises a thin skin which is in electrically conductive relationship with the tube and which is of copper, aluminum or other metal (including alloys) having high electrical conductivity. In a transmission line contemplated by the invention, the new inductor sheath is around at least a portion of the length of the electric transmission line conductor, is insulated from the conductor, and is electromagnetically coupled with the conductor by an electromagnetic field arising from alternating current carired by the conductor. When a transmission line having an inductor sheath in accordance with the invention in carrying alternating current at a frequency of about 40 cycles per second (c.p.s.) to about 1000 c.p.s. and the temperature of the sheath is near freezing temperature, the iron-nickel-molybdenum alloy tube in the sheath is in a ferromagnetic condition and electromagnetically induced circulating currents flow through the skin of the sheath, thereby resulting in heat losses which prevent ice from forming and/or remaining on the sheath.

A typical power line contemplated by the invention carries 400 amperes at full load and is required to be ice-free at one-quarter load. The field strength at the surface of such a transmission line carrying a current of about 100 amperes is about 25 oersteds. At this field strength, in order to obtain good temperature-responsive results including efficient low-loss transmission when at temperatures substantially above freezing and good heating for de-icing when at temperatures near or below freezing the loss in watts per meter of the line must be low, i.e., less than 6 watts per meter, when the line is at 20° C. but must be high, advantageously at least about 25 watts per meter, when the line is at 2° C.

It is necessary, in order to achieve good temperature-responsive results in accordance with the invention, that the tube in the sheath of the invention be of an alloy characterized by a high rate of increase of magnetic induction with decreasing temperature $(-dB/dT)$ when in a field of about 25 oersteds.

The present invention provides an iron-nickel-molyddenum alloy characterized by a high rate of increase in magnetic induction with decreasing temperature at a field strength of about 25 oersteds where the environmental temperature is decreasing from substantially above freezing temperature to near or below freezing temperature, e.g., where temperature decreases from 40° C. to 0° C., which alloy contains 3% to 11% molybdenum, nickel in an amount in accordance with the relationship (Ni-Mo relationsip)

36.1 (percent Ni)−10.1 (percent Mo)−1025=20 to 40 and balance essentially iron. Thus, the nickel content of the alloy of the invention can be about 29.8% to 32.6% depending upon the molybdenum content. All alloy percentages herein are by weight. In the alloy of the sheath, molybdenum increases the resistivity, but the molybdenum content should not be above 11% as otherwise the alloy presents a two-phase structure in which one phase has a detrimentally high Curie point; this phase, the theta phase, is a magnetic phase and it disadvantageously persists at high ambient temperatures. (Reference may be made in this connection to "Ferromagnetism" by R. M. Bozorth, 2nd Printing, 1953, page 135, particularly Fig. 5–38.) More particularly, the iron-nickel-molybdenum alloy of the invention is characterized by an average minus $dB/dT$ value of at least about 160 gauss per degree centigrade over a temperature range of 20° C. below the effective Curie temperature at about 25 oersteds. Also, the alloy of the invention is characterized by a Curie temperature in the range of about 20° C. to about 40° C. and by a high rate of increase in magnetic permeability with decrease in temperature.

It is advantageous that the tube of the inductor sheath be characterized by high electrical resistivity in order that the skin effect should not reduce the magnetization by eddy current shielding. The iron-nickel-molybdenum alloy of the invention is characterized by high electrical resistivity of at least about 80 microhm-centimeters at about 20° C.

The nickel content of the alloy of the invention with 3% to 11% molybdenum must not be less than or greater than the amount required by the foregoing Ni-Mo relationship. Otherwise, with regard to the Ni-Mo relationship, if the nickel content of the alloy is too low, the alloy will be detrimentally characterized by structural instability at sub-zero temperatures and if the nickel content is too high, the alloy will be detrimentally characterized by too high a Curie point.

It is important that the rate of increase of magnetic induction of the alloy at 25 oersteds with decreasing temperature $(-dB/dT)$ should be as high as possible. In the nickel-molybdenum-iron system, minus $dB/dT$ increases with increasing nickel and molybdenum over the induction range of 5000 to 2000 gauss. Therefore, the optimum alloy should possess as high a percentage of nickel and molybdenum as is consistent with the alloy still remaining single-phase.

In carrying the invention into practice, it is advantageous that an alloy according to the invention contain 9.4% molybdenum and 32.1% nickel with the balance (with the exception of impurities) being iron.

The theoretical Curie point of the alloy containing 9.4% molybdenum, 32.1% nickel and balance essentially iron is about 38.9° C, as calculated by the following formula:

Curie temperature (centigrade)=36.1(percent Ni)−10.1 (percent Mo)−1025

Where the balance of an alloy is referred to herein as "essentially iron" it is to be understood that the alloy can also contain small amounts of other elements but the total impurities must be less than about 0.05% of the alloy. In any event, the total percentage of iron, nickel and molybdenum in the alloy of the invention is at least 99.95%.

Most advantageously the alloy of the invention does not contain any, or is essentially free of, silicon, manganese, chromium and copper and in carrying the invention into practice any amounts of these elements, if present in the alloy, are maintained as low as is commercially practical in making high purity alloys. Introducing silicon in the alloy has very strong and detrimental effect of lowering the Curie temperature and additions of copper detrimentally raise the Curie temperature. Silicon, manganese and chromium do not diffuse readily in the alloy and their presence is detrimental to production of the alloy by powder metallurgical techniques. Also, manganese has a high vapor pressure and if present in the alloy would render the alloy composition difficult or impossible to control in vacuum melting. Tungsten is not employed as a substitute for molybdenum in the alloy since it has an important disadvantage of a high density and thus would detrimentally increase the weight of the sheath and result in too heavy a load on the cable.

The alloy of the invention is readily made into articles, including the tube for the new inductor sheath, by powder metallurgy. This is an advantage since insuring that a specific embodiment of the alloy has characteristics advantageous for the invention, including a Curie point or temperature within 10° C. of a desired value, requires very close control of the alloy composition. With the alloy composition in accordance with the invention precise control over composition is especially easily obtained by powder metallurgical techniques.

In making the inductor sheath of the invention, the skin of high conductivity metal such as cooper or aluminum can be provided on the iron-nickel-molybdenum alloy tube by wrapping and lining with aluminum or copper or by plating with copper. For example, the new inductor sheath can be a composite of an iron-nickel-molybdenum alloy in accordance with the invention clad with copper. Advantageously, the skin material has a resistivity not greater than about 3.5 microhm-centimeters at about room temperature. While the tube of the inductor sheath is typically of cylindrical configuration, with the tube and outer skin being mutually contacting and concentric cylinders, the invention also contemplates inductor sheats of other configurations, but all must be coaxial and of the same shape as the conductor to give a close, very small, air gap. Generally, the ratio of the wall thickness of the tube to the thickness of the skin is about 100:1 to about 1:1, for example, a ratio of 25:1 is effective with aluminum as the skin and a ratio of 75:1 is effective with copper as the skin.

Turning now to the drawing, FIG. 1 shows insulated electric power transmission line conductor cable 10 and shows inductor sheath 11 which surrounds a portion of the transmission line conductor cable. FIGS. 2 and 3 show a plurality of conductor wires 12 in a multistranded conductor with electrical insulation 13 between inductor sheath 11 and conductor wires 12. Inductor sheath 11 comprises iron-nickel-molybdenum alloy tube 14 with continuous mutually contacting and concentric copper skin (or layer) 15 which is in electrically conductive relationship with tube 14.

For the purpose of giving those skilled in the art a better understanding of the invention and a better appreciation of the advantages of the invention, the following illustrative example is given.

Example

An inductor sheath on a transmission line in accordance with the invention comprises a cylindrical tube of about 2 centimeters (cms.) internal diameter and about 0.5 cm. wall thickness. The tube is of an alloy containing about 32.1% nickel, about 9.4% molybdenum and balance essentially iron in accordance with the invention. The sheath also comprises a copper skin of about 0.005 cm. thickness on the surfaces of the tube, this thickness being the optimum thickness for generation of circulatory currents under conditions pertaining to the present example. When coupled with an electromagnetic field of about 25 oersteds such as is generated by a 100 ampere alternating current at about 50 cycles per second (cps.) in an insulated electric conductor within the sheath, the sheath has electric power losses, in watts per meter length at different temperatures, which are set forth in the table hereinafter.

TABLE

| Temperature: | Losses in watts per meter length at 25 oersteds |
|---|---|
| −10° C. | 32 |
| 0° C. | 30 |
| +10° C. | 15 |
| +20° C. | 3.8 |
| +30° C. | less than 1 |

Accordingly when the transmission line with sheath in accordance with the present example is exposed to an icing environment, e.g., rain at 0° C., while carrying 100 amperes alternating current, no ice is formed on the sheath.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. An alloy consisting essentially of molybdenum, nickel and iron in amounts totaling at least 99.95% of the alloy, with molybdenum in an amount of 3% to 11% of the alloy, nickel in an amount such that the percentages of nickel and molybdenum in the alloy are in accordance with the relationship.

36.1 (percent Ni)−10.1 (percent Mo)−1025=20 to 40 with balance iron including not more than 0.05% impurities and characterized by high electrical resistivity of at least about 80 microhm-centimeters at about 20° C., a Curie temperature of about 20° C. to about 40° C. and by a high rate of increase of magnetic induction with decreasing temperature of at least about 160 gauss per degree centigrade throughout a temperature range extending from the Curie temperature of the alloy to about 20° C. below said Curie temperature at a field strength of about 25 oersteds.

2. An alloy as set forth in claim 1 containing about 9.4% molybdenum and about 32.1% nickel.

3. A temperature-responsive inductor sheath for use in developing heat to inhibit formation of ice on an electric power transmission line comprising a tube of an alloy consisting essentially of 3% to 11% molybdenum, nickel in an amount such that the percentages of nickel and molybdenum in the tube alloy are in accordance with the relationship 36.1 (percent Ni)−10.1 (percent Mo)−1025=20 to 40 with balance essentially iron and having in electrical contact with the surfaces of said tube a continuous skin of a low resistivity metal, said temperature-responsive sheath being characterized by greater magnetic induction when at a temperature below 20° C. than when at a temperature above 40° C.

4. A temperature-responsive inductor sheath as set forth in claim 3 wherein the ratio of the wall thickness of the tube to the thickness of the skin is about 100:1 to 1:1.

5. A temperature-responsive inductor sheath as set forth in claim 3 wherein the tube is of an alloy consisting essentially of about 9.4% molybdenum, about 32.1% nickel and balance essentially iron.

6. A temperature-responsive inductor sheath as set forth in claim 3 wherein the skin is of a metal characterized by electrical resistivity not greater than about 3.5 microhm-centimeters at room temperature.

7. A temperature-responsive inductor sheath as set forth in claim 3 wherein the skin is of copper.

8. A temperature-responsive inductor sheath as set forth in claim 3 wherein the skin is of aluminum.

9. An electric power transmission line especially adapted for inhibiting formation of ice thereon when carrying alternating current comprising an electric power transmission conductor, an iron-nickel-molybdenum alloy tube around at least a portion of the length of said conductor, said iron-nickel-molybdenum alloy consisting essentially of 3% to 11% molydenum, nickel in an amount such that the percentages of nickel and molybdenum in the alloy are in accordance with the relationship 36.1 (percent Ni)−10.1 (percent Mo)−1025=20 to 40 with balance essentially iron, electrical insulation between said conductor and said tube and a continuous skin of low resistivity metal on the surfaces of said tube and in electrically conducting relationship with said tube, said low resistivity metal being characterized by an electrical resistivity not greater than about 3.5 microhm-centimeters at room temperature.

10. An electric power transmission line as set forth in claim 9 wherein the tube is of an alloy consisting essentially of about 9.4% molybdenum, about 32.1% nickel and balance essentially iron.

References Cited by the Examiner

UNITED STATES PATENTS

| | | | |
|---|---|---|---|
| 2,775,536 | 12/1956 | Fine | 148—11 |
| 2,930,725 | 3/1960 | Clark | 75—123 |
| 3,009,047 | 11/1961 | Simmons | 317—133 X |
| 3,218,384 | 11/1965 | Shaw | 174—40 |

LEWIS H. MYERS, *Primary Examiner.*

H. HUBERFELD, *Assistant Examiner.*